(12) United States Patent
Luo et al.

(10) Patent No.: US 12,541,066 B2
(45) Date of Patent: Feb. 3, 2026

(54) BIDIRECTIONAL OPTICAL MODULE WITH SEPARATED SUBASSEMBLIES

(71) Applicant: Global Technology Inc., Ningbo (CN)

(72) Inventors: Jian-Hong Luo, Ningbo (CN); Fu Chen, Ningbo (CN); Dong-Biao Jiang, Ningbo (CN); Hao Zhou, Ningbo (CN)

(73) Assignee: Global Technology Inc., Ningbo (CN)

( * ) Notice: Subject to any disclaimer, the term of this patent is extended or adjusted under 35 U.S.C. 154(b) by 580 days.

(21) Appl. No.: 17/975,431

(22) Filed: Oct. 27, 2022

(65) Prior Publication Data

US 2023/0418007 A1    Dec. 28, 2023

(51) Int. Cl.
*G02B 6/42* (2006.01)
*G02B 6/12* (2006.01)

(52) U.S. Cl.
CPC ......... *G02B 6/4246* (2013.01); *G02B 6/4263* (2013.01); *G02B 6/4271* (2013.01); *G02B 2006/1204* (2013.01)

(58) Field of Classification Search
None
See application file for complete search history.

(56) References Cited

U.S. PATENT DOCUMENTS

| | | | | |
|---|---|---|---|---|
| 5,673,129 A | * | 9/1997 | Mizrahi | H01S 5/0687 398/91 |
| 7,379,633 B1 | * | 5/2008 | Ashley | G02B 6/138 385/14 |
| 2002/0110302 A1 | * | 8/2002 | Gopalakrishnan | G02F 1/2255 359/254 |
| 2008/0031564 A1 | * | 2/2008 | Sugiyama | G02F 1/0356 385/9 |
| 2010/0086310 A1 | * | 4/2010 | Lee | H04B 10/40 398/138 |
| 2011/0052125 A1 | * | 3/2011 | Lee | G02B 6/4271 385/88 |
| 2021/0294040 A1 | * | 9/2021 | Sakai | G02B 6/4246 |
| 2022/0404679 A1 | * | 12/2022 | Hung | G02F 1/2255 |

* cited by examiner

*Primary Examiner* — Jerry Rahll
(74) *Attorney, Agent, or Firm* — Grossman Tucker Perreault & Pfleger, PLLC

(57) ABSTRACT

A bidirectional optical module includes a TOSA, a ROSA and an optical filter. The TOSA includes a light emitting unit and a thin film LiNbOx modulator, and the thin film LiNbOx modulator is optically coupled with the light emitting unit. The ROSA is connected with the TOSA. The optical filter is provided for a fiber port which the TOSA shares with the ROSA.

9 Claims, 5 Drawing Sheets

BIDIRECTIONAL OPTICAL MODULE WITH SEPARATED SUBASSEMBLIES

CROSS-REFERENCE TO RELATED APPLICATIONS

This application claims priority under 35 U.S.C. § 119(a) on Patent Application No(s). 202210715751.6 filed in China on Jun. 23, 2022, the entire contents of which are hereby incorporated by reference.

BACKGROUND

1. Technical Field

The present disclosure relates to optical communication, more particularly to a bidirectional optical module.

2. Related Art

Optical modules are generally installed in electronic communication facilities in modern high-speed communication networks. With the improvement of optical communication system and the increase in demand of wide bandwidth for various network services, issues of insufficient internal space and high energy consumption of the conventional optical communication systems need to be tackled. Any solution to provide the small size optical communication systems at minimum expense of internal accommodation space and energy consumption without sacrificing both the bandwidth and transmission speed has been one of the important topics in this technical field.

SUMMARY

According to one aspect of the present disclosure, a bidirectional optical module includes a transmitter optical subassembly (TOSA), a receiver optical subassembly (ROSA) and an optical filter. The TOSA includes a light emitting unit and a thin film lithium niobate (LiNbOx) modulator, and the thin film LiNbOx modulator is optically coupled with the light emitting unit. The ROSA is connected with the TOSA. The optical filter is arranged to allow for the TOSA to share a same fiber port with the ROSA.

According to another aspect of the present disclosure, a bidirectional optical module includes a TOSA and a ROSA. The TOSA includes a casing, a light emitting unit and a thin film LiNbOx modulator. The light emitting unit and the thin film LiNbOx modulator are accommodated in the casing, and the thin film LiNbOx modulator is optically coupled with the light emitting unit. The ROSA includes a TO-can outline and a light receiving unit. The TO-can outline is connected with the casing of the TOSA, the light receiving unit is accommodated in the TO-can outline, and the TOSA shares a fiber port with the ROSA.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

With the gradual development of 5G networks, electro-absorption modulated laser (EML) is used as a mainstream laser emitter in an optical module to replace direct modulated laser (DML), in order to ensure high transmission rate and transmission stability. EML enjoys the advantage of consistent laser characteristics for long distance transmission applications (usually over 10 km). However, as to an optical module including EML, the optical module is required to be designed into hermetically sealed structure to be in compliance with corresponding MSAs (Multi-Source Agreements), with EML operations associated with higher power and more complex circuit layout. These requirements might just increase higher cost for the setup of 5G base stations, thus hindering the popularization process of 5G networks. Therefore, providing an optical module that features low cost and meets the requirements for long distance and high speed transmission is one of the urgent problems to be solved in this technical field.

Moreover, since each 5G base station includes a large amount of optical modules, bidirectional design is considered as a replacement of conventional unidirectional design for the optical module, which helps reduce the size of optical module and in turn control the space to be occupied by the 5G base station. However, the use of bidirectional design will cause more serious reflection noises, such that the optical module with bidirectional design still have some shortcomings to overcome for them to be more widely adopted in high transmission rate applications.

Figure 1:
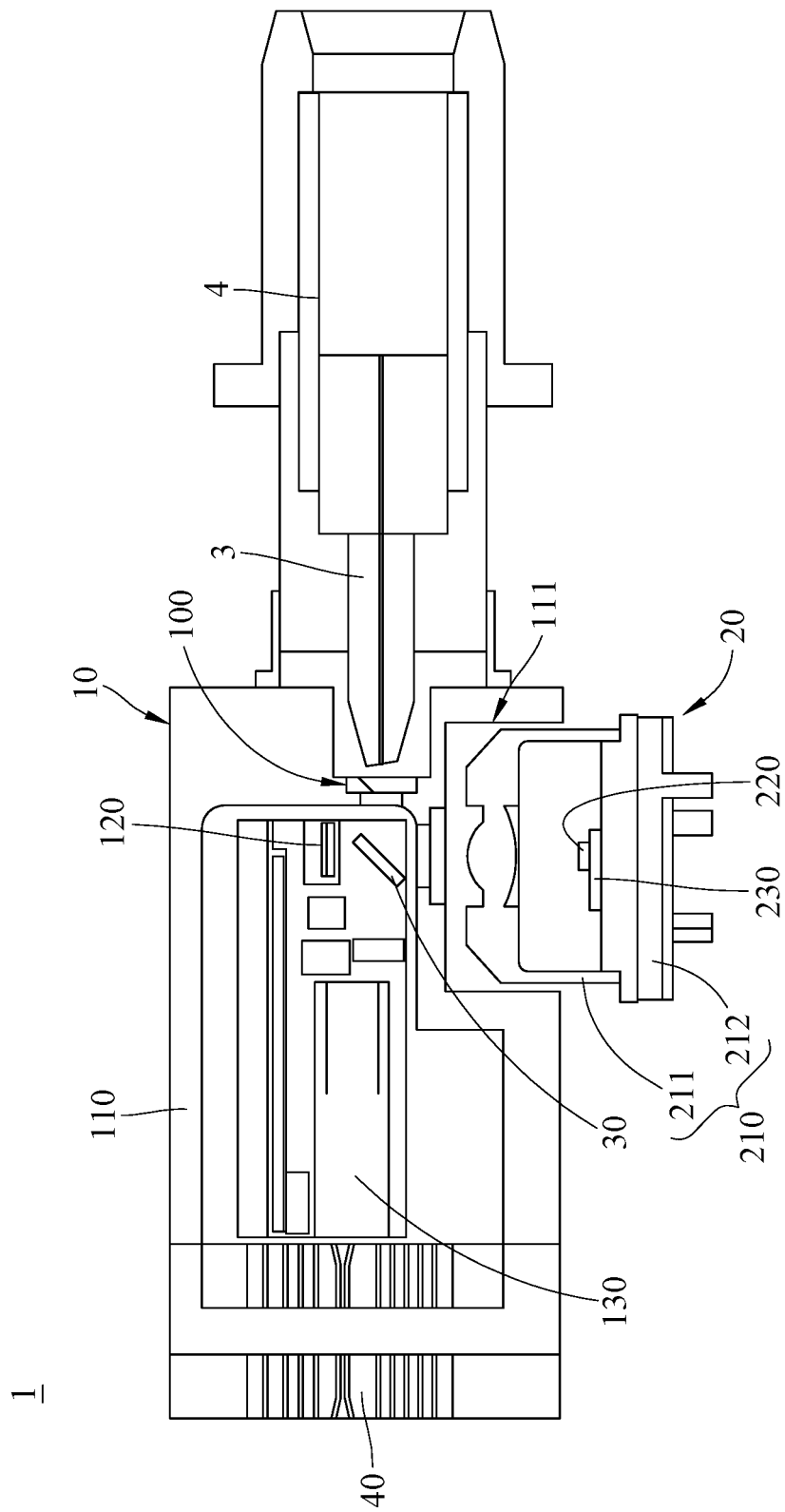
FIG. 1 is a top view of a bidirectional optical module according to one embodiment of the present disclosure.
Figure 2:
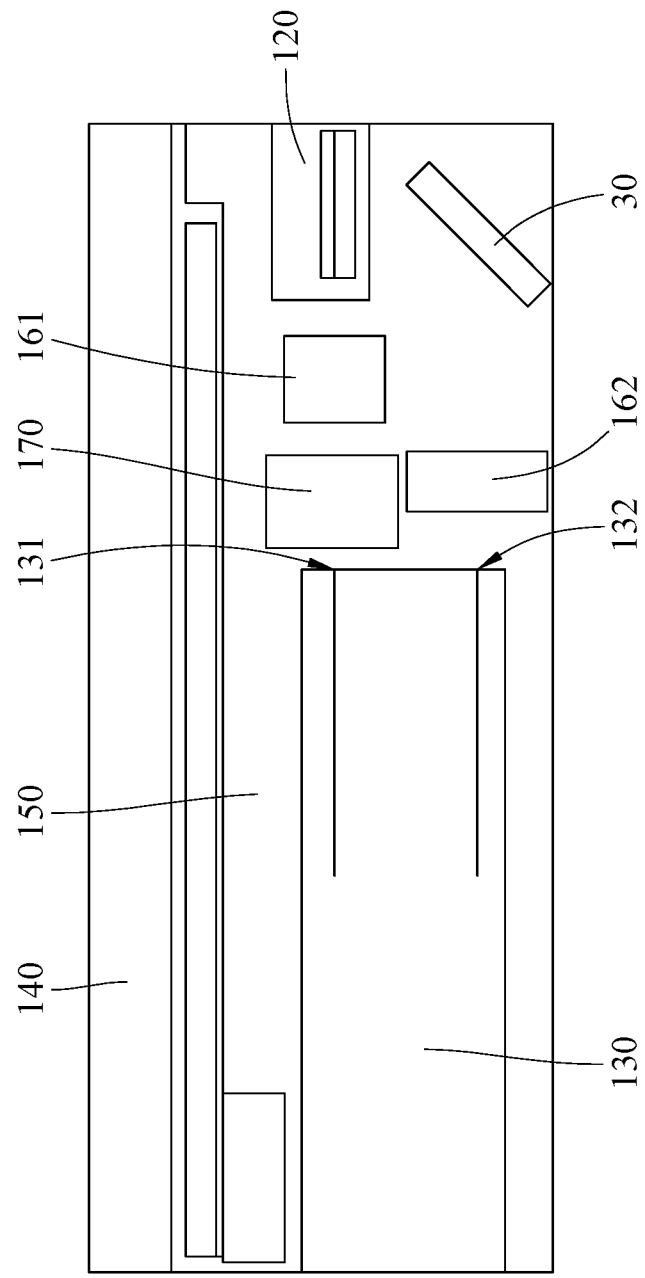
FIG. 2 is a top view of a TOSA of the bidirectional optical module in FIG. 1.
Figure 3:
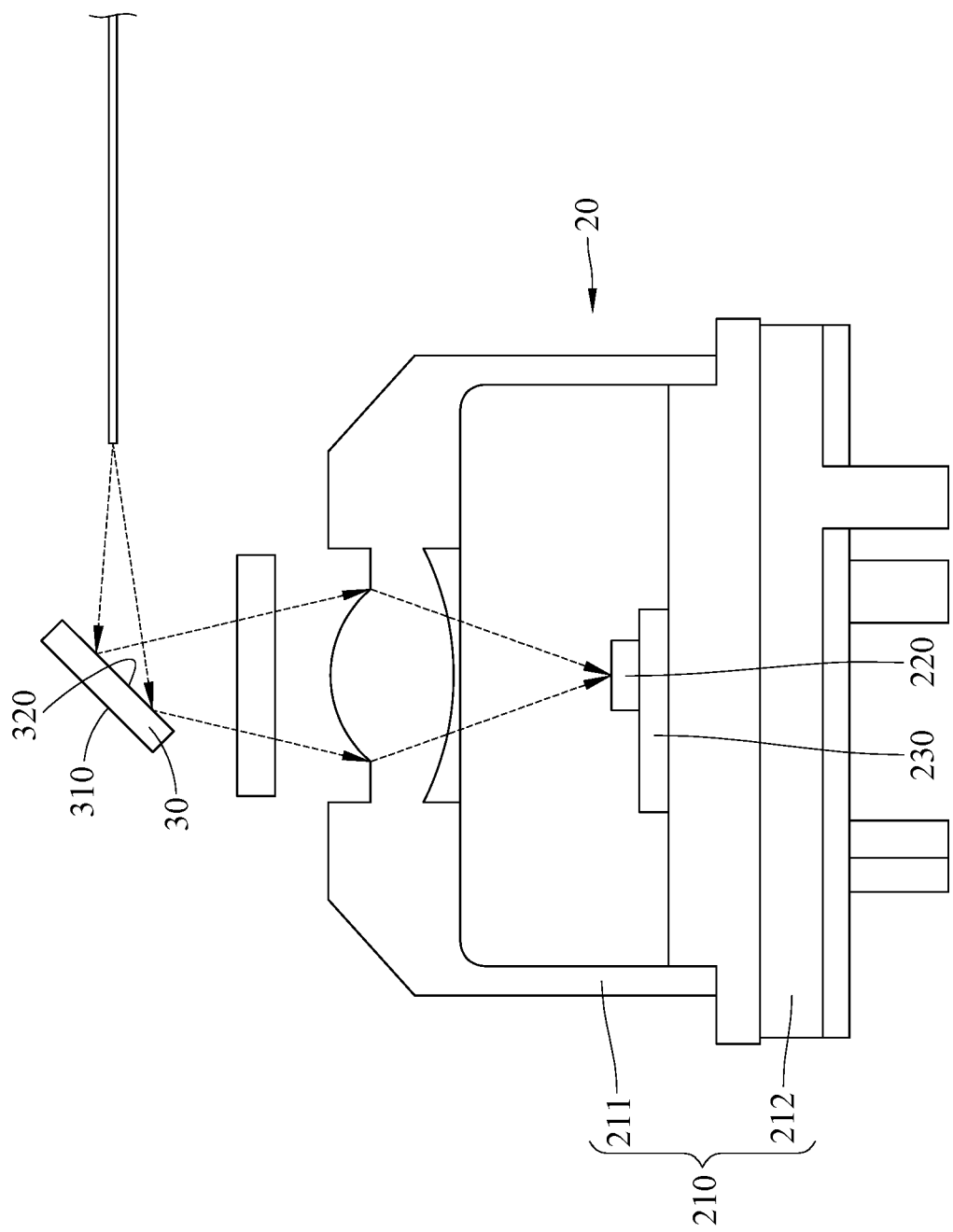
FIG. 3 is a top view of a ROSA of the bidirectional optical module in FIG. 1.

According to the present disclosure, a bidirectional optical module may include a TOSA and a ROSA connected with each other. Please refer to FIG. 1 through FIG. 3. FIG. 1 is a top view of a bidirectional optical module according to one embodiment of the present disclosure, FIG. 2 is a top view of a TOSA of the bidirectional optical module in FIG. 1, and FIG. 3 is a top view of a ROSA of the bidirectional optical module in FIG. 1. In this embodiment, a bidirectional optical module 1 may be a single channel optical module that includes a TOSA 10 and a ROSA 20. It is worth noting that the bidirectional optical module could be a single fiber bidirectional optical module.

The TOSA 10 may include an airtight or non-airtight casing 110, a light emitting unit 120 and a LiNbOx (for example, LiNbO3) modulator 130, and the light emitting unit 120 and the thin film thin film LiNbOx modulator 130 may be accommodated in the casing 110. The light emitting unit 120 may be, but not limited to, a laser emitter, and the bandwidth and the wavelength of the laser emitter are not limited. The thin film LiNbOx modulator 130 may include a LiNbOx modulation chip packaged in an encapsulation.

The thin film LiNbOx modulator 130 may have a light receiving port 131 and a light propagate port 132, the light receiving port 131 may be optically coupled with the light emitting unit 120, and the light propagate port 132 may be optically coupled with a fiber port 100, which allows for an optical fiber to pass therethrough, formed on the casing 110. The fiber port 100 and the light emitting unit 120 may be located on the same side of the thin film LiNbOx modulator 130. A ferrule 3 and a ceramic sleeve 4 may be disposed in proximity of the fiber port 100.

The TOSA 10 may further include a thermoelectric cooler 140 accommodated in the casing 110. The thin film LiNbOx modulator 130 may be supported on the thermoelectric cooler 140 and in thermal contact with the thermoelectric cooler 140. Specifically, a heat sink 150 may be disposed on the top surface of the thermoelectric cooler 140, and the thin film LiNbOx modulator 130 may be located on the heat sink 150.

Furthermore, the TOSA 10 may further include two coupling lenses 161 and 162 and an optical isolator 170. The coupling lens 161 and the optical isolator 170 may be disposed between the light emitting unit 120 and the light receiving port 131 of the thin film LiNbOx modulator 130, and the coupling lens 162 may be disposed between the light propagate port 132 of the thin film LiNbOx modulator 130 and the fiber port 100. The light emitting unit 120 may be optically coupled with the thin film LiNbOx modulator 130 through the coupling lens 161 and the optical isolator 170, and the thin film LiNbOx modulator 130 may be optically coupled with single optical fiber (not shown in the drawings) inserted into the fiber port 100 through the coupling lens 162. The optical signal generated by the light emitting unit 120 may pass through the coupling lens 161, the optical isolator 170 and the light propagate port 132 so as to travel into the thin film LiNbOx modulator 130. The thin film LiNbOx modulator 130 can modulate optical signals, and the modulated optical signals can be transmitted through the coupling lens 162 before being coupled into the optical fiber inserted into the fiber port 100.

The ROSA 20 may include a TO-can outline 210 and a light receiving unit 220. The TO-can outline 210 may be connected with the casing 110 of the TOSA 10. More specifically, the TO-can outline 210 may include a TO cap 211 and a stem 212. The casing 110 may have a cavity 111 corresponding to the TO cap 211, and the cavity 111 may receive the TO cap 211. In one implementation, the TO cap 211 may be soldered to the casing 110 when received in the cavity 111. The TO cap 211 may have a light pass aperture, and a transparent window, such as a quartz glass sheet, may be provided in the light pass aperture so as to allow the optical signals to pass therethrough to thereby reach the light receiving unit 220 of the ROSA 20. The light receiving unit 220 may be, for example but not limited to, a photodiode accommodated in the TO-can outline 210. In this embodiment, the ROSA 20 may also include a transimpedance amplifier (TIA) 230 configured to convert electric current to voltage signals.

In this embodiment, the bidirectional optical module 1 may include an optical filter 30 accommodated in the casing 110 of the TOSA 10. The optical filter 30 can change a traveling direction of an incident light traveling toward the ROSA 20. In detail, the optical filter 30 may allow a modulated optical signal (for example, an optical signal with a wavelength of 1270 nm) propagated from the light propagate port 132 of the thin film LiNbOx modulator 130 to pass therethrough to reach the fiber port 100. Also, a traveling direction of the incident light (for example, an external optical signal with a wavelength of 1330 nm) entering from the fiber port 100 can be changed by the optical filter 30 to travel toward the ROSA 20. It can be more specifically referred to FIG. 3 that the external optical signal propagated from the fiber port 100 may be reflected by the optical filter 30, such that the reflected external optical signal that travels toward the ROSA 20 could be received by the light receiving unit 220. It is worth noting that the present disclosure does not intend to limit the wavelength of the optical signals mentioned above. The wavelength of the optical signals mentioned herein may refer to a peak in a spectral linewidth, and said optical signals in different wavelengths may refer to at least two different peaks.

FIG. 1 through FIG. 3 exemplarily show an optical filter 30 including a 45° reflective dichroic color filter, and the dichroic color filter may have a first optical surface 310 and a second optical surface 320 opposite to each other. The optical coating on the first optical surface 310 and the second optical surface 320 may be transmittable surfaces for the optical signals (for example, an optical signal with a wavelength of 1270 nm) provided by the thin film LiNbOx modulator 130. As such, the first optical surface 310 and the second optical surface 320 may be associated with high transmittance for the optical signals emitted by the TOSA 10. Furthermore, the optical coating on the second optical surface 320 may be a reflective surface for the external optical signal (for example, an external optical signal with a wavelength of 1330 nm) entering from the fiber port 100. Consequently, the second optical surface 320 may be associated with high reflectivity for the optical signals entering from the fiber port 100. The terms "high transmittance" and "high reflectivity" mentioned herein refer to the transmittance or reflection that meets the requirements for optical signal communication. For example, a transmittance of at least 95% and a reflectivity of at least 99% may be defined as high transmittance and high reflectivity, respectively, in order to achieve relevant technical effects for optical communication applications.

Referring to FIG. 1, in this embodiment, the bidirectional optical module 1 may further include a ceramic feedthrough 40 attached to the casing 110 of the TOSA 10 by soldering and brazing, and the ceramic feedthrough 40 may be electrically connected with the thin film LiNbOx modulator 130. The ceramic feedthrough 40 may be used for meeting the requirements of broad bandwidth and low radio frequency loss.

Figure 4:
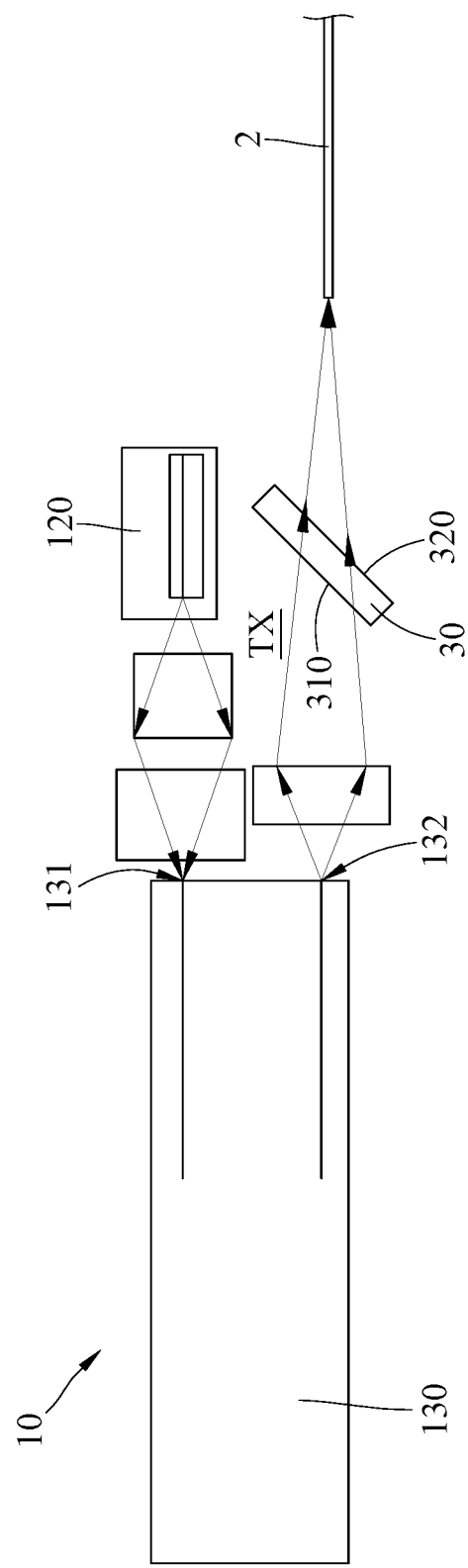
FIG. 4 is a schematic view showing an optical path of the TOSA of the bidirectional optical module in FIG. 1.
Figure 5:
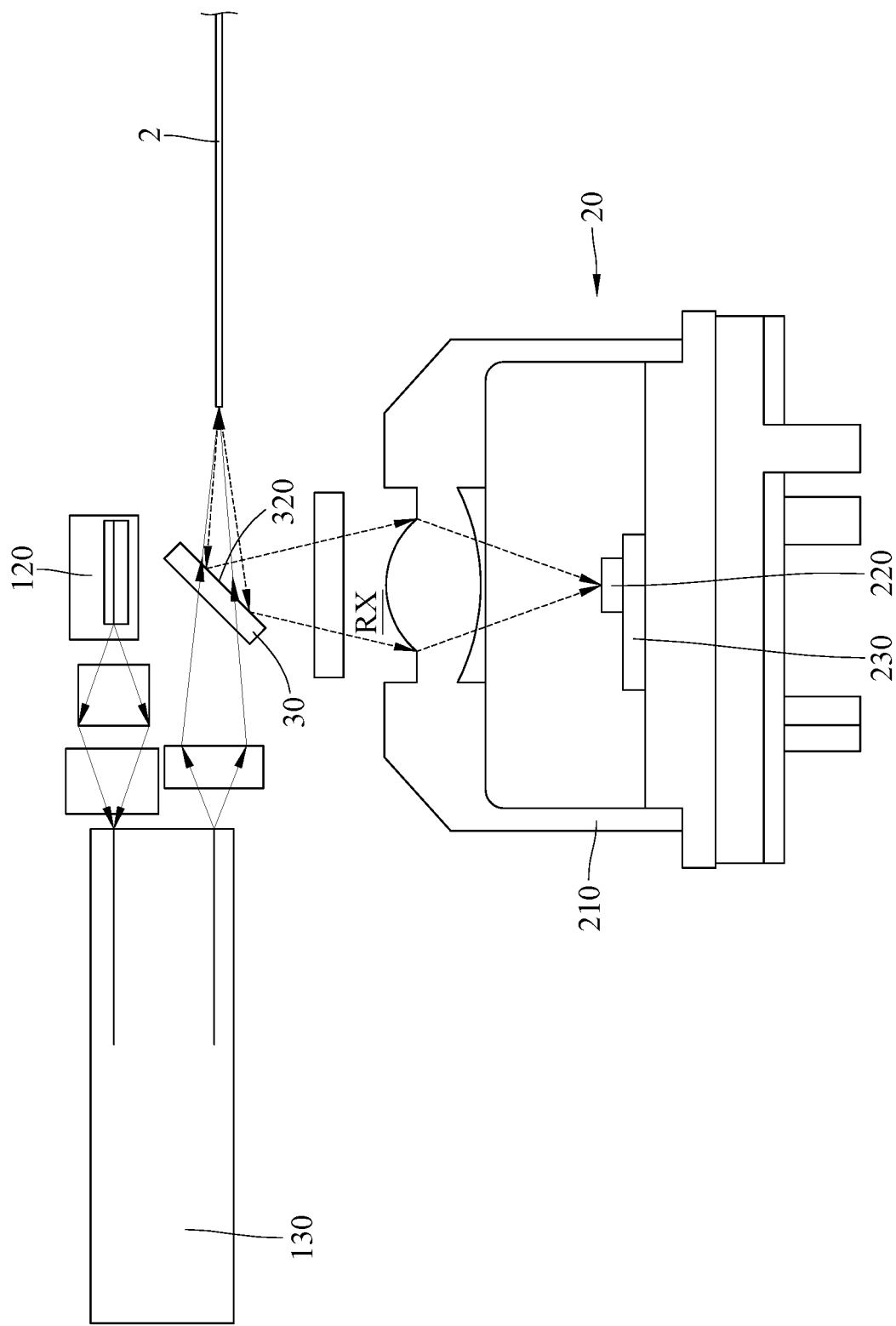
FIG. 5 is a schematic view showing an optical path of the ROSA of the bidirectional optical module in FIG. 1.

The single fiber bidirectional optical module according to the present disclosure could have the TOSA 10 sharing the same fiber port 100 with the ROSA 20. FIG. 4 is a schematic view showing an optical path of the TOSA of the bidirectional optical module in FIG. 1, and FIG. 5 is a schematic view showing an optical path of the ROSA of the bidirectional optical module in FIG. 1. As shown in FIG. 4, a single channel optical signal emitted by the light emitting unit 120 is coupled into the thin film LiNbOx modulator 130. The optical signal is modulated by the thin film LiNbOx modulator 130 before a modulated optical signal propagated from the light propagate port 132 of the thin film LiNbOx modulator 130 could be generated. The modulated optical signal is allowed to pass through the first optical surface 310 and the second optical surface 320 of the optical filter 30 to thereby reach the optical fiber 2 without turning or even tweaking the optical path TX along the original path. Therefore, the optical fiber 2 may be optically coupled with the fiber port 100 in FIG. 1.

As shown in FIG. 5, the external optical signal may enter into the TOSA 10 through the optical fiber 2. The external optical signal is reflected by the second optical surface 320 of the optical filter 30, such that the optical path RX is turned once at the second optical surface 320 before reaching the ROSA 20. The external optical signal is eventually received by the light receiving unit 220 which is non-coaxially aligned with the optical fiber 2. The light receiving unit 220 converts the received optical signal into corresponding electrical signal before outputting the electrical signal. The addition of the optical filter 30 might enable the optical module with one receiver and one transmitter to be bi-directional (both in and out of the optical module).

According to the present disclosure, the bidirectional optical module 1 includes the thin film LiNbOx modulator 130, and the thin film LiNbOx modulator 130 can modulate optical signal, such that the wavelength and the bandwidth of the modulated optical signal can meet the requirement of long distance optical communication. Thus, the laser emitter for the bidirectional optical module 1 can be implemented with lower cost and less energy consumption compared with EML used in conventional design choices. For example, the laser emitter for the bidirectional optical module 1 may be a continuous wave laser (CW laser). In addition, the use of the thin film LiNbOx modulator 130 effectively enhances transmission quality in connection with the optical signal it modulates, rendering the bidirectional optical module 1 more suitable for long distance and high speed optical communication applications.

In a conventional bidirectional optical module, the TOSA and the ROSA are usually packaged in a single casing, and the TOSA is coaxially disposed with the optical fiber. As such, in order to receive light propagated from the outside through the optical fiber into the casing, the optical module also includes one or more additional optical reflectors inside the casing to enable optical path turning. And for any conventional bidirectional optical module to accommodate more components such as those extra reflectors the casing thereof would need to be larger in size. According to the present disclosure, the bidirectional optical module 1 includes the TOSA 10 and the ROSA 20 connected with each other. More specifically, the TOSA 10 and the ROSA 20 are two separated optical components, such that the thin film LiNbOx modulator 130 and the light receiving unit 220 can be packaged in different casings and bonded with each other by soldering (for example, using a solder for bonding material) or gluing. Such arrangement intends get the size of any subassembly under control while simplifying the bonding process of the casings. The properly sized subassembly could go a long way to improving the compactness of the bidirectional optical module 1, with the simple bonding process enhancing production efficiency and reducing manufacturing cost. The design proposed in the present disclosure could still meet the MSA specifications.

According to the present disclosure, the thin film LiNbOx modulator can modulate the optical signal, such that the wavelength and the bandwidth of the modulated optical signal can meet the requirements for long distance and high speed optical communication applications. Thus, the laser emitter in the bidirectional optical module can be used with low cost and less energy consumption, which helps to reduce manufacturing cost.

Furthermore, the bidirectional optical module of the present discourse further includes a ROSA connected with the TOSA. Accordingly, the thin film LiNbOx modulator and the light receiving unit of the ROSA can be packaged in different casings and bonded with each other by soldering or gluing, which is helpful to prevent any subassembly from overly large size, and the subassembly with proper size is helpful for the compactness of the bidirectional optical module.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. A bidirectional optical module, comprising:
   a transmitter optical subassembly, comprising a light emitting unit and a thin film lithium niobate (LiNbOx) modulator, and the thin film LiNbOx modulator being optically coupled with the light emitting unit;
   a receiver optical subassembly, connected with the transmitter optical subassembly; and
   an optical filter, wherein the transmitter optical subassembly is arranged to allow for the transmitter optical subassembly to share a same fiber port with the receiver optical subassembly;
   wherein the transmitter optical subassembly further comprises a casing accommodating the light emitting unit, the thin film LiNbOx modulator and the optical filter, the light emitting unit and the fiber port are located at a same side of the thin film LiNbOx modulator;
   wherein the thin film LiNbOx modulator has a light receiving port and a light propagate port on the same side thereof, the light receiving port is optically coupled with the light emitting unit, and the light propagate port is optically coupled with the fiber port.

2. The bidirectional optical module according to claim 1, wherein the receiver optical subassembly comprises:
   a TO-can outline connected with the casing of the transmitter optical subassembly; and
   a light receiving unit accommodated in the TO-can outline.

3. The bidirectional optical module according to claim 1, wherein the transmitter optical subassembly further includes a thermoelectric cooler, the thin film LiNbOx modulator is supported on the thermoelectric cooler and in thermal contact with the thermoelectric cooler.

4. The bidirectional optical module according to claim 1, wherein the optical filter changes a traveling direction of an external optical signal from the fiber port toward the receiver optical subassembly, and the optical filter allows an optical signal generated by the thin film lithium niobate modulator to travel therethrough to reach the fiber port.

5. The bidirectional optical module according to claim 1, wherein the bidirectional optical module is a single channel optical module.

6. A bidirectional optical module, comprising:
   a transmitter optical subassembly, comprising a casing, a light emitting unit and a thin film LiNbOx modulator, wherein the light emitting unit and the thin film LiNbOx modulator are accommodated in the casing, and the thin film LiNbOx modulator is optically coupled with the light emitting unit; and
   a receiver optical subassembly, comprising a TO-can outline and a light receiving unit, wherein the TO-can outline is connected with the casing of the transmitter optical subassembly, the light receiving unit is accommodated in the TO-can outline, and the transmitter optical subassembly shares a fiber port with the receiver optical subassembly;

wherein the thin film LiNbOx modulator has a light receiving port and a light propagate port on the same side thereof, the light receiving port is optically coupled with the light emitting unit, and the light propagate port is optically coupled with the fiber port.

7. The bidirectional optical module according to claim 6, wherein the transmitter optical subassembly further comprises a thermoelectric cooler, the thin film LiNbOx modulator is supported on the thermoelectric cooler and in thermal contact with the thermoelectric cooler.

8. The bidirectional optical module according to claim 6, further comprising an optical filter accommodated in the casing of the transmitter optical subassembly, wherein the optical filter changes a traveling direction of an external optical signal from the fiber port toward the receiver optical subassembly, and the optical filter allows an optical signal generated by the thin film LiNbOx modulator to travel therethrough to reach the fiber port.

9. The bidirectional optical module according to claim 6, wherein the bidirectional optical module is a single channel optical module.

\* \* \* \* \*